(No Model.)
F. HARLAN.
DEVICE FOR PROTECTING FRUIT TREES.
No. 405,552. Patented June 18, 1889.
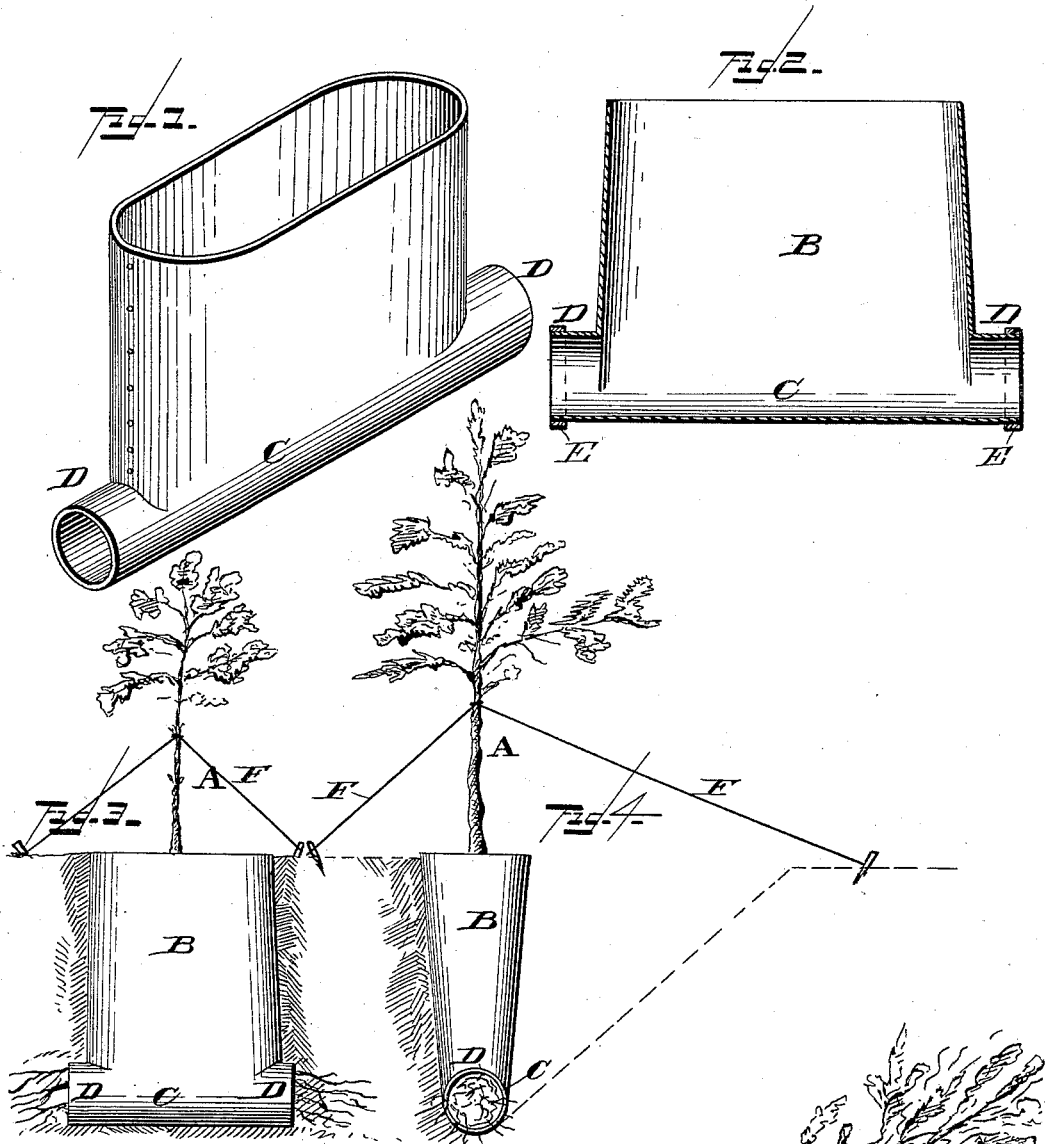
WITNESSES,
F. L. Durand
George A. Wooster
INVENTOR,
Frank Harlan,
by Louis Baggert
Attorney.

UNITED STATES PATENT OFFICE.

FRANK HARLAN, OF CANTON, MISSOURI.

DEVICE FOR PROTECTING FRUIT-TREES.

SPECIFICATION forming part of Letters Patent No. 405,552, dated June 18, 1889.

Application filed March 23, 1889. Serial No. 304,390. (No model.)

*To all whom it may concern:*

Be it known that I, FRANK HARLAN, a citizen of the United States, and a resident of Canton, in the county of Lewis and State of Missouri, have invented certain new and useful Improvements in Devices for Protecting Fruit-Trees; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my device for growing and protecting trees. Fig. 2 is a longitudinal sectional view of the same. Fig. 3 is a side view of the device as applied to a growing tree. Fig. 4 is an end view of the same at right angles to the view shown in Fig. 3, and Fig. 5 illustrates the tree and device as they appear during winter when laid down on the ground and covered for protection.

Like letters of reference denote corresponding parts in all the figures.

My invention has relation to means for protecting growing fruit and other "half-hardy" trees—such as peach, quince, Japanese persimmon, &c.—in localities where the climatic conditions are too severe for the successful propagation and fruition of such trees in the open air; and it consists in the device which will be hereinafter described.

In the accompanying drawings, the letter A designates a fruit-tree to which my growing and protecting device (shown at B) has been applied. The latter consists of a vessel or receptacle of suitable size and material, (preferably galvanized sheet-iron,) and of the shape shown in the drawings—that is to say, a flat and deep box U-shaped in cross-section, with downwardly-tapering sides and a rounded bottom C, having two circular extensions D D, forming outlets at opposite ends of the receptacle. These circular or tubular outlets may be re-enforced by strengthening rings or bands, as shown at E in Fig. 2, if desired.

When a tree is to be planted, the roots are carefully placed in the box or receptacle B and trained by careful manipulation, so as not to break them, into a flattened shape, conforming to the interior configuration of the box, with the ends of the roots projecting through the end apertures or outlets D, as shown in Fig. 3. The box is then carefully packed with earth and mold, as in ordinary planting, and is placed in an upright position in a hole or pit dug in the ground for its reception at the place where the tree is to be planted permanently, which should be of such a depth that the top of the root box or receptacle B shall be even, or nearly so, with the surface of the ground. The box with the tree planted in it is placed in this pit in an upright position and braced by wires or guy-ropes F, the lower ends of which are fastened to stakes driven into the ground. The pit is then filled up and packed with earth, after which the process of planting is complete.

The roots of the tree will, after planting, gradually grow and project from the outlets D D out into the adjoining earth, where they get a firm foothold, and serve to keep the tree and box firmly in their places. In this position the trees are left during the periods of budding, blooming, and fruiting, and when the season is over and the trees are to be protected for the winter all that is necessary to do is to dig out the earth on one side of the pit, as indicated in dotted lines in Fig. 4, down to the rounded bottom of the box, remove or loosen the guy-ropes, and tilt the box to one side, so as to lay the tree flat on the ground in an inclined position, as illustrated in Fig. 5. This tilting of the box is facilitated by its rounded bottom, which forms, so to speak, a fulcrum for the box and tree. Care must be taken during this operation not to break or otherwise damage the branches, and after the tree has in this manner been placed in the proper position it is covered with straw, leaves, or other litter. It remains in this position throughout the winter, and when spring returns is again raised to its vertical position, braced by its guy-ropes, as before, and the pit is again filled up around the box.

It will be seen that by turning the box B sidewise upon its rounded bottom as a fulcrum the roots which project out through the axial extensions or openings D D are given only a quarter of a turn or twist, which I have found by experience does not affect them injuriously in the least, the parts of the roots which are subjected to this twisting being covered and protected by the tubular projections D.

Instead of constructing the box or receptacle B wholly of metal, it may be made of metal and wood combined, in which case I prefer to construct the side pieces and bottom of sheet metal, in one piece, while the ends are made of wood. The manner of using the device is the same, of course, irrespective of the material of which it is constructed.

Having thus described my invention, I claim and desire to secure by Letters Patent of the United States—

1. The root box or protector, consisting of a box of suitable material adapted to be tilted sidewise on its bottom and having outlets or apertures at opposite ends in a line with the axis of the bottom, substantially as and for the purpose set forth.

2. The root box or protector B, having a rounded bottom C and tubular extensions D D, open at their outer ends, substantially as and for the purpose set forth.

In testimony that I claim the foregoing as my own I have hereunto affixed my signature in presence of two witnesses.

FRANK HARLAN.

Witnesses:
B. H. SMITH,
B. B. BROOKS.